US010514008B2

(12) United States Patent
Choi et al.

(10) Patent No.: US 10,514,008 B2
(45) Date of Patent: Dec. 24, 2019

(54) VEHICLE RESONATOR AND VEHICLE AIR CLEANER HAVING THE SAME

(71) Applicants: Hyundai Motor Company, Seoul (KR); Kia Motors Corporation, Seoul (KR)

(72) Inventors: Wonseop Choi, Anyang-si (KR); Ju Ho Han, Gwangju (KR); Sung Hyuk Yoon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 134 days.

(21) Appl. No.: 15/705,557

(22) Filed: Sep. 15, 2017

(65) Prior Publication Data

US 2018/0291848 A1    Oct. 11, 2018

(30) Foreign Application Priority Data

Apr. 7, 2017  (KR) .................. 10-2017-0045177

(51) Int. Cl.
| F02M 35/12 | (2006.01) |
| F02M 35/14 | (2006.01) |
| B01D 46/00 | (2006.01) |
| F02M 35/024 | (2006.01) |
| F02M 35/02 | (2006.01) |

(52) U.S. Cl.
CPC ..... F02M 35/1255 (2013.01); B01D 46/0005 (2013.01); F02M 35/0205 (2013.01); F02M 35/02416 (2013.01); F02M 35/1283 (2013.01); F02M 35/14 (2013.01)

(58) Field of Classification Search
CPC ........... F02M 35/0201; F02M 35/0205; F02M 35/0209; F02M 35/1255; F02M 35/1261; F02M 35/1266; F02M 35/1283; F02M 35/14; F02M 35/1222
See application file for complete search history.

(56) References Cited

U.S. PATENT DOCUMENTS

| 5,756,945 A * | 5/1998 | Maeda ............... F02M 35/1266 181/229 |
| 6,349,690 B2 * | 2/2002 | Utsumi .................. F02M 35/14 123/184.57 |
| 6,681,888 B2 * | 1/2004 | Lepoutre ........... F02M 35/1261 181/249 |
| 7,540,353 B2 * | 6/2009 | Okawa .............. F02M 35/1266 123/184.57 |

(Continued)

FOREIGN PATENT DOCUMENTS

| JP | 2008150954 A | * | 7/2008 | |
| JP | 2013124599 A | * | 6/2013 | ........... F01N 13/007 |

OTHER PUBLICATIONS

Atomura, JP 2008-150954, machine translation (Year: 2008).*
Fukumoto, JP 2013-124599, machine translation (Year: 2013).*

*Primary Examiner* — Hung Q Nguyen
*Assistant Examiner* — Mark L. Green
(74) *Attorney, Agent, or Firm* — Morgan, Lewis & Bockius LLP

(57) ABSTRACT

A vehicle resonator includes a mounting portion provided in an air cleaner housing of a vehicle, and a resonance container mounted on the mounting portion to be replaceable in a sliding manner and having a resonance space therein communicating with an intake passage inside the air cleaner housing.

19 Claims, 6 Drawing Sheets

(56) References Cited

U.S. PATENT DOCUMENTS

| | | | | |
|---|---|---|---|---|
| 7,614,380 B2* | 11/2009 | Tsutsui | ............ | F02M 35/10295 |
| | | | | 123/184.57 |
| 7,975,802 B2* | 7/2011 | Yokoya | ............ | F02M 35/10295 |
| | | | | 123/184.57 |
| 10,100,793 B2* | 10/2018 | Ohta | ................. | F02M 35/1266 |

* cited by examiner

VEHICLE RESONATOR AND VEHICLE AIR CLEANER HAVING THE SAME

CROSS-REFERENCE TO RELATED APPLICATION(S)

The present application claims priority to Korean Patent Application No. 10-2017-0045177, filed on Apr. 7, 2017, the entire contents of which is incorporated herein for all purposes by the present reference.

BACKGROUND OF THE INVENTION

Field of the Invention

The present invention relates to a vehicle resonator which can easily change an attenuation frequency of noise and a vehicle air cleaner having the same.

Description of Related Art

An intake system of a vehicle includes an intake duct for supplying outside air to an engine, an air cleaner for filtering out foreign matter from the outside air flowing through the intake duct, and a resonator for reducing intake noise.

The resonator attenuates noise and pulsations at specific frequencies by using the resonance principle. That is, the resonator functions to reduce the noise and pulsation of intake air in a state where the resonator is installed in an intake duct or a case of the air cleaner connected to the engine.

Since the resonator installed in the intake system of a conventional vehicle has a predetermined internal volume, its function is limited to attenuating noise at a specific frequency. Also, since the resonator is integrated with the intake duct or the air cleaner case, it is difficult to separate and replace the resonator. Therefore, in order to change the frequency of the resonator by adjusting the volume of the resonator, the air cleaner case or the like need to be newly manufactured.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a vehicle resonator that can easily change attenuation frequencies of noise and a vehicle air cleaner having the same.

Additional aspects of the invention will be set forth in part in the description which follows and, in part, will be obvious from the description, or may be learned by practice of the invention.

In accordance with one aspect of the present invention, a vehicle resonator may include a mounting portion provided in an air cleaner housing of a vehicle; and a resonance container mounted on the mounting portion to be replaceable in a sliding manner and having a resonance space therein communicating with an intake passage inside the air cleaner housing.

The resonance container may include an opening communicating with the intake passage and a coupling step provided at a periphery of the opening and coupled to the mounting portion, and the mounting portion may include mounting grooves provided on opposite sides thereof to be parallel to each other so that the coupling step is coupled in a sliding manner.

The resonator may further include a sealing member interposed between the coupling step and the mounting grooves.

The coupling step may be provided in a form of a flange at the periphery of the opening, and the sealing member may be formed of elastic material and be disposed to cover an external surface of the coupling step.

The sealing member may include a protrusion formed continuously at an external surface thereof, and the mounting grooves may include a recessed portion that is formed on an internal surface thereof to be correspondingly coupled to the protrusion.

The resonance container may further include an expansion/contraction deforming portion provided along a sidewall periphery thereof to vary a volume of the resonance space.

The expansion/contraction deforming portion may be formed in a bellows shape by use of elastic material.

The resonance container may include a container frame provided with the opening and the coupling step; a bottom panel spaced from the container frame and disposed opposite to the opening; and an expansion/contraction deforming portion that is formed in a bellows shape and forms a sidewall connecting a periphery of the container frame and a periphery of the bottom panel.

The resonance container may further include an adjusting device to adjust deformation of the expansion/contraction deforming portion.

The adjusting device may include a plurality of screw shafts extending toward the periphery of the bottom panel in a state of being fixed to the container frame; a plurality of fastening portions provided at the periphery of the bottom panel and to which the plurality of screw shafts are coupled, respectively; and a plurality of tightening nuts fastened to the plurality of screw shafts to fix the fastening portions and adjust positions of the fastening portions.

In accordance with another aspect of the present invention, a vehicle resonator may include a mounting portion provided in an air cleaner housing of a vehicle; and a resonance container mounted on the mounting portion and having a resonance space therein communicating with an intake passage inside the air cleaner housing, wherein the resonance container includes an expansion/contraction deforming portion provided along a sidewall periphery thereof to vary a volume of the resonance space.

In accordance with more another aspect of the present invention, a vehicle air cleaner may include an air cleaner housing connected to an intake passage of a vehicle; and a resonator disposed in the air cleaner housing, wherein the resonator may include a mounting portion provided in the air cleaner housing; and a resonance container mounted on the mounting portion to be replaceable in a sliding manner and having a resonance space therein communicating with an intake passage inside the air cleaner housing.

The air cleaner housing may include: a main body including a filter accommodating portion which has an open upper portion and in which an air filter is accommodated, and a space forming portion provided integrally with the filter accommodating portion at a side of the filter accommodating portion and having an open upper portion; and a cover member coupled to an upper portion of the main body and having a first cover portion covering the upper portion of the filter accommodating portion, a second cover portion covering the upper portion of the space forming portion, and a mounting portion on which the resonance container is mounted.

The resonance container may include an opening communicating with the intake passage and a coupling step provided at a periphery of the opening and coupled to the mounting portion, and the mounting portion may include mounting grooves extending from the first cover portion and the second cover portion and provided on opposite sides thereof to be parallel to each other so that the coupling step is coupled in a sliding manner.

The cover member may include: a first partitioning portion partitioning the filter accommodating portion and an internal space of the mounting portion and having a first air hole communicating an intake passage of the filter accommodating portion and an internal of the resonance container; a second partitioning portion partitioning the filter accommodating portion and the space forming portion and having a plurality of second air holes communicating the intake passage of the filter accommodating portion and an internal of the space forming portion; and a third partitioning portion partitioning the space forming portion and the internal space of the mounting portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
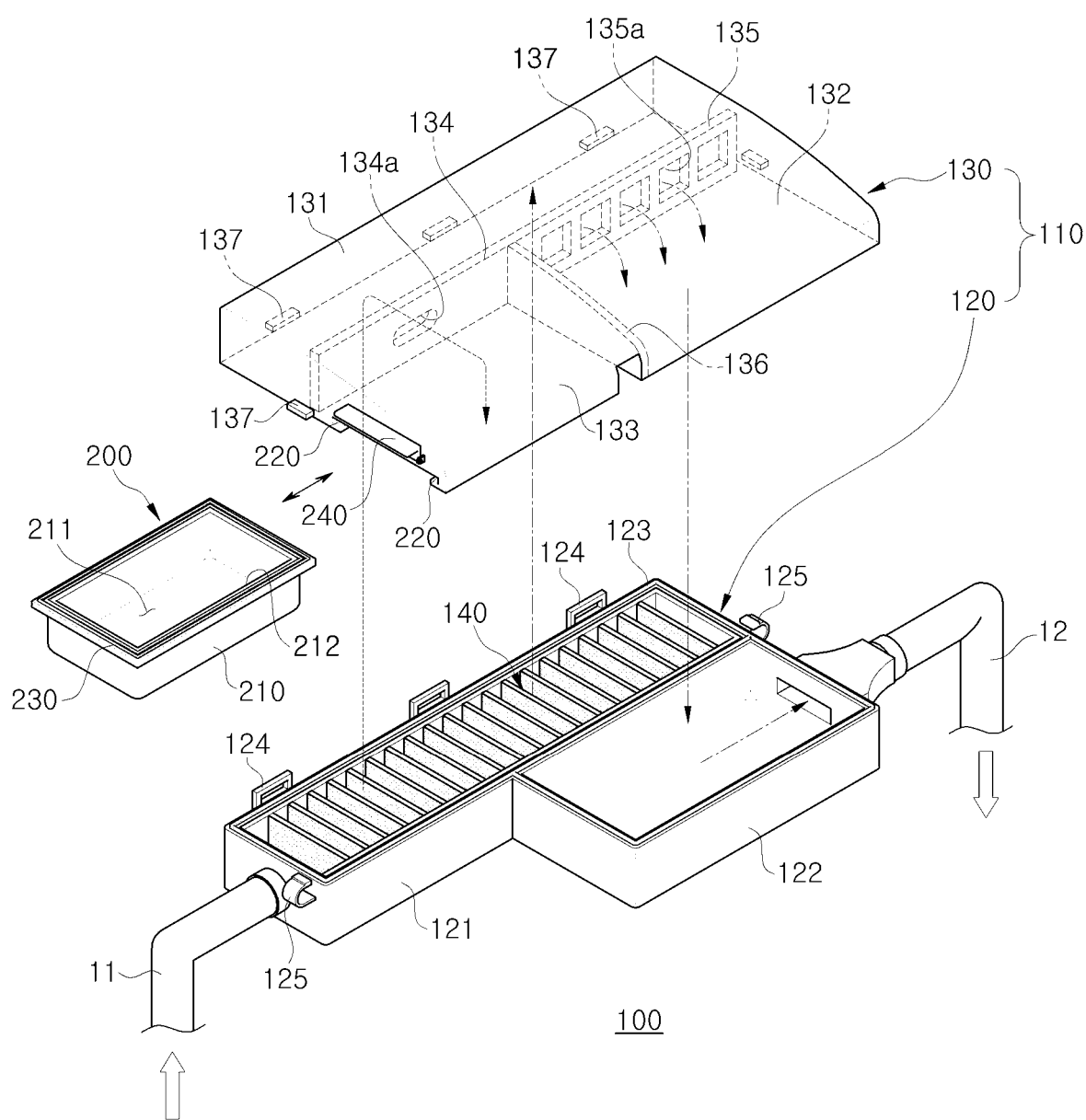
FIG. 1 is an exploded perspective view illustrating a vehicle air cleaner to which a resonator according to an exemplary embodiment of the present invention is applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. The drawings are not intended to limit the scope of the present invention in any way, and the size of components may be exaggerated for clarity of illustration.

Figure 2:
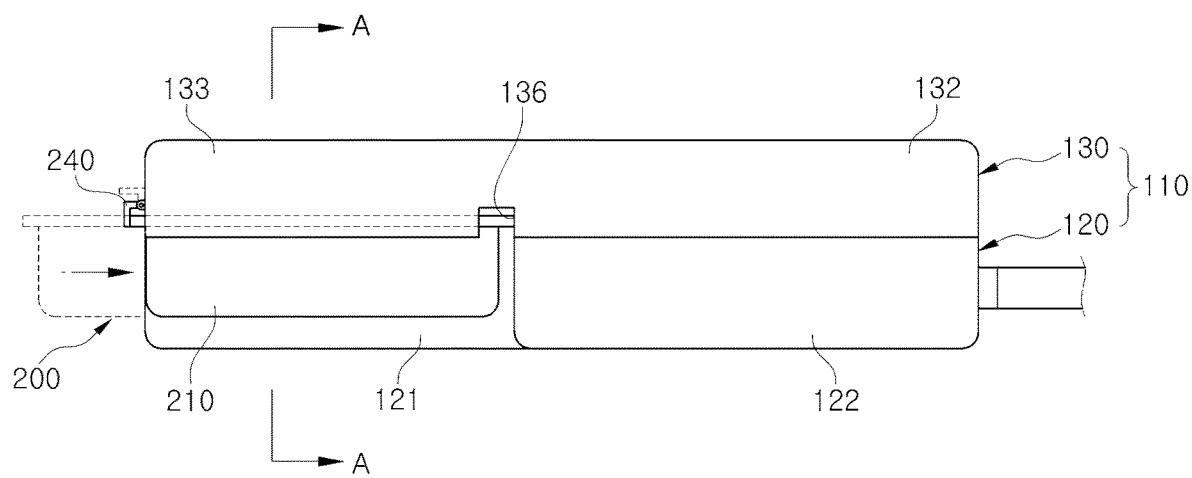
FIG. 2 is a side view illustrating an assembled state of the vehicle air cleaner shown in FIG. 1.
Figure 3:
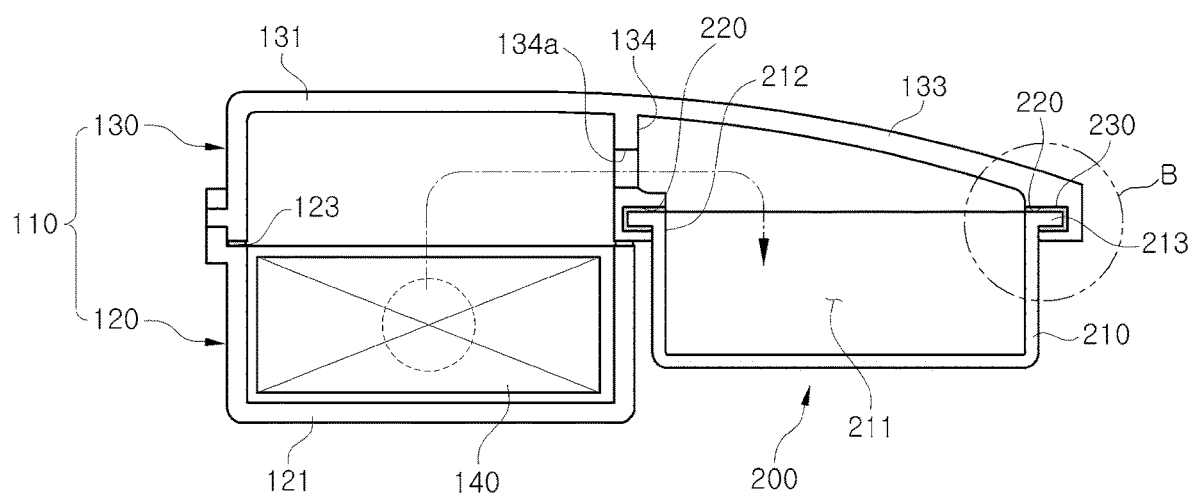
FIG. 3 is a cross-sectional view taken along line A-A in FIG. 2.
Figure 4:
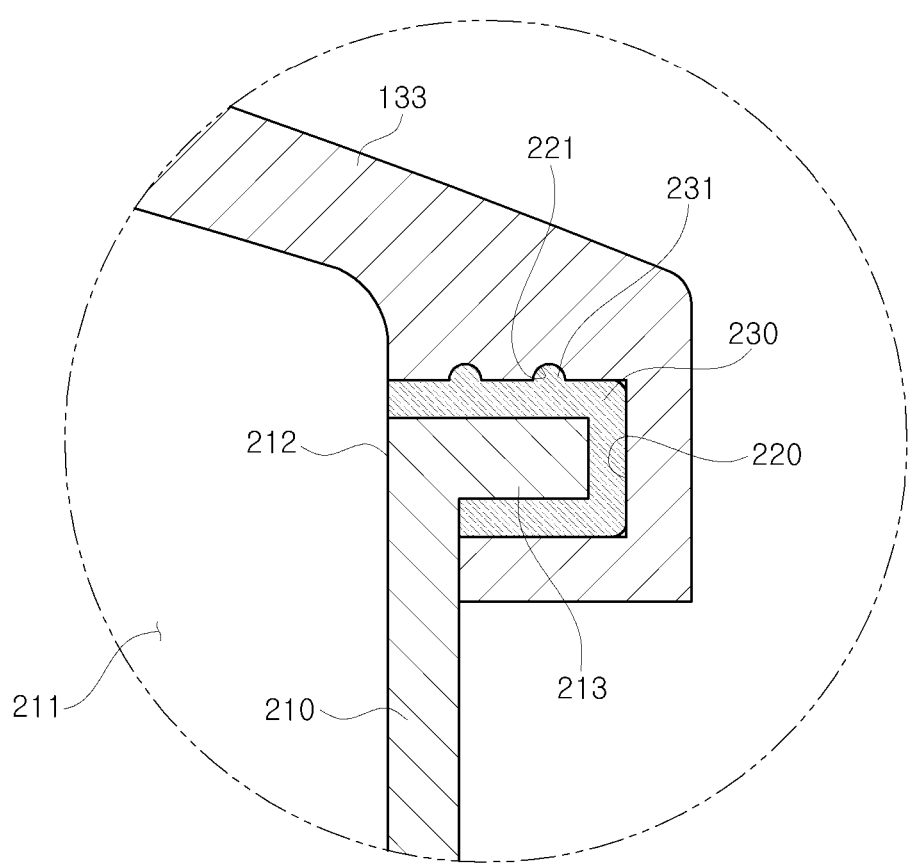
FIG. 4 is a detailed view of portion B of FIG. 3.

FIG. 1 is an exploded perspective view illustrating a vehicle air cleaner to which a resonator according to an exemplary embodiment of the present invention is applied, FIG. 2 is a side view illustrating an assembled state of the vehicle air cleaner shown in FIG. 1, FIG. 3 is a cross-sectional view taken along line A-A in FIG. 2, and FIG. 4 is a detailed view of portion B of FIG. 3.

Referring to FIG. 1, FIG. 2, and FIG. 3, an air cleaner 100 according to the present embodiment includes an air cleaner housing 110, an air filter 140 accommodated in the air cleaner housing 110, and a resonator 200 having a replaceable resonance container 210.

The air cleaner housing 110 includes a main body 120 having an open upper portion and a cover member 130 covering the open upper portion of the main body 120. The main body 120 includes a filter accommodating portion 121 having an open upper portion and an air filter 140 accommodated therein, and a space forming portion 122 integrally provided with a side of the filter accommodating portion 121 and having an open upper portion.

A first intake pipe 11 is connected to the filter accommodating portion 121 so that outside air can be introduced into the filter accommodating portion 121, and a second intake pipe 12 is connected to the space forming portion 122 so that the outside air passing through the insides of the filter accommodating portion 121 and the space forming portion 122 can be supplied to an engine.

The filter accommodating portion 121 and the space forming portion 122 may be provided in a box shape, respectively, and the space forming portion 122 may be formed to have a shorter length and a larger width than the filter accommodating portion 121. The space forming portion 122 may be integrally formed with the filter accommodating portion 121 in a state of being biased toward the second intake pipe 12 through injection molding.

The cover member 130 is coupled to the upper portion of the main body 120 to cover the open upper portion of the main body 120. The cover member 130 includes a first cover portion 131 for covering the upper portion of the filter accommodating portion 121, a second cover portion 132 for covering the upper portion of the space forming portion 122, and a mounting portion 133 integrally provided with the first and second cover portions 131 and 132 and to a lower side of which the resonance container 210 of the resonator 200 is coupled.

In addition, the cover member 130 may include a first partitioning portion 134 partitioning the internal spaces of the filter accommodating portion 121 and the mounting portion 133 and having a first air hole 134a communicating an intake passage in the filter accommodating portion 121 with the internal of the resonance container 210, a second partitioning portion 135 partitioning the filter accommodating portion 121 and the space forming portion 122 and having a plurality of second air holes 135a communicating the intake passage of the filter accommodating portion 121 with the internal of the space forming portion 122, and a third partitioning portion 136 partitioning the internal spaces of the space forming portion 122 and the mounting portion 133.

A packing 123 is disposed at an upper end portion of the main body 120 so that the periphery of the cover member 130 and the first to third partitioning portions 134, 135 and 136 can be coupled in a sealed state. The main body 120 and the cover member 130 include a plurality of coupling portions 124, 125, and 137 for mutual coupling.

In the vehicle air intake system employing the air cleaner 100, outside air introduced through the first intake pipe 11 enters the filter accommodating portion 121, and is purified by passing through the air filter 140 in the filter accommodating portion 121. The outside air passing through the filter accommodating portion 121 flows into the space forming portion 122 through the second air holes 135a and the outside air in the space forming portion 122 can be supplied to the engine of the vehicle through the second intake tube 12.

Referring to FIGS. 1 and 3, the resonator 200 includes a mounting portion 133 provided at the cover member 130, and a resonance container 210 mounted on the mounting portion 133 to be replaceable in a sliding manner and having a resonance space 211 therein communicating with the intake passage inside the filter accommodating portion 121.

The resonance container 210 may be in a form of a rectangular box with an open upper portion. The resonance container 210 includes an opening 212 communicating with the intake passage in the filter accommodating portion 121 through the first air hole 134a when the resonance container 210 is mounted on the mounting portion 133, and a coupling step 213 provided in a form of a flange at the periphery of the opening 212.

The mounting portion 133 on which the resonance container 210 is mounted is provided at the cover member 130 to extend continuously from the first cover portion 131 and the second cover portion 132. Further, the mounting portion 133 is provided with mounting grooves 220 provided at opposite sides thereof to be parallel to each other so that the coupling step 213 of the resonance container 210 can be coupled in a sliding manner.

The resonator 200 includes a sealing member 230 interposed between the coupling step 213 and the mounting grooves 220, as shown in FIG. 3 and FIG. 4. The sealing member 230 may be formed of elastic material including rubber or silicone and may be mounted on the coupling step 213 in a form of covering the external surface of the coupling step 213.

Referring to FIG. 4, the sealing member 230 may include one or more protrusions 231 formed continuously along the external surface thereof, and the mounting grooves 220 may have one or more recessed portions 221 corresponding to the protrusions 231 at the internal surface thereof. Therefore, the upper opening 212 of the resonance container 210 can be completely sealed in a state that the resonance container 210 is fully mounted.

As shown in FIG. 1 and FIG. 2, the resonator 200 can be easily separated or mounted by moving the resonance container 210 in a sliding manner for replacement of the resonance container 210. As shown in FIG. 2, when the resonance container 210 is mounted, an end portion of the coupling step 213 that enters first is caught by the third partitioning portion 136 of the cover member 130, so that the fully mounted state can be visually confirmed. Also, after the resonance container 210 is completely mounted, the resonance container 210 can be prevented from being detached by locking the coupling step 213 using a lock portion 240.

As shown in FIG. 3, since the resonance space 211 of the resonance container 210 is communicates with the intake passage of the internal of the filter accommodating portion 121 through the first air hole 134a in a state where the resonance container 210 is completely mounted, the intake noise at a specific frequency can be reduced and the pulsation of the intake air can be attenuated.

When noise improvement of the vehicle intake system is required, the resonance container 210 can be replaced with another one having a different internal volume, so that the attenuation frequency of the intake noise can be easily adjusted. Since the resonator 200 of the present embodiment allows the resonance container 210 to be separated and replaced in a sliding manner, the driver or the maintenance engineer can easily tune the resonator 200. Therefore, the performance of the vehicle NVH (noise, vibration, harshness) can be easily improved in accordance with the requirements of the driver or passenger.

Figure 5:
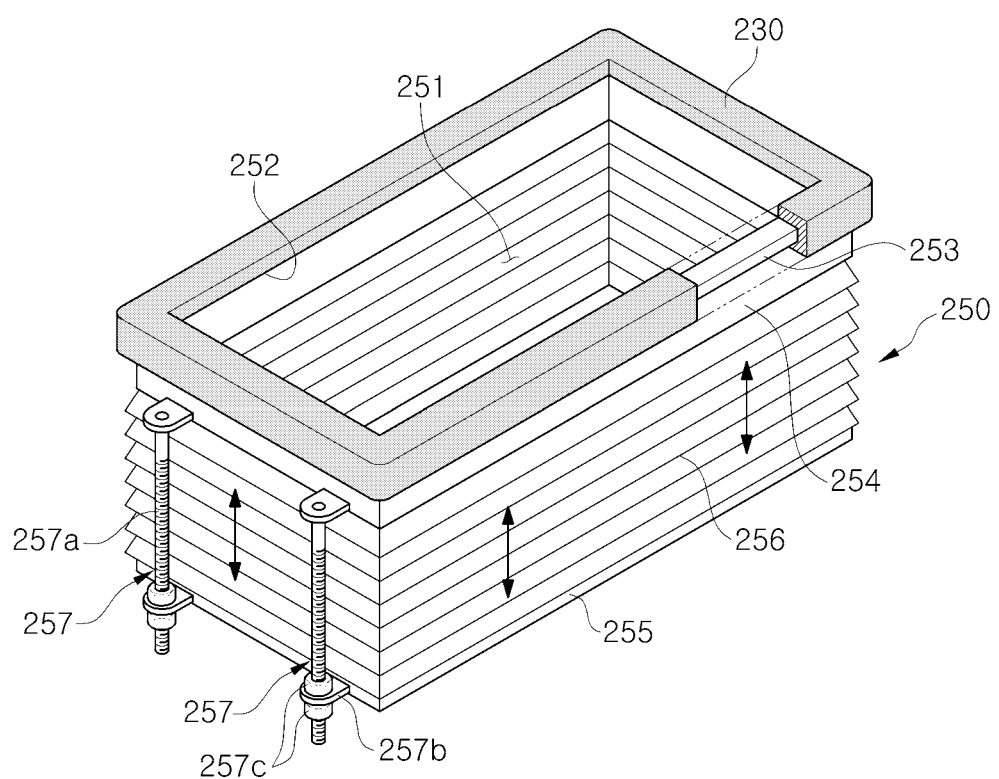
FIG. 5 is a perspective view illustrating a modified example of a resonance container of the vehicle resonator according to the exemplary embodiment of the present invention.
Figure 6:
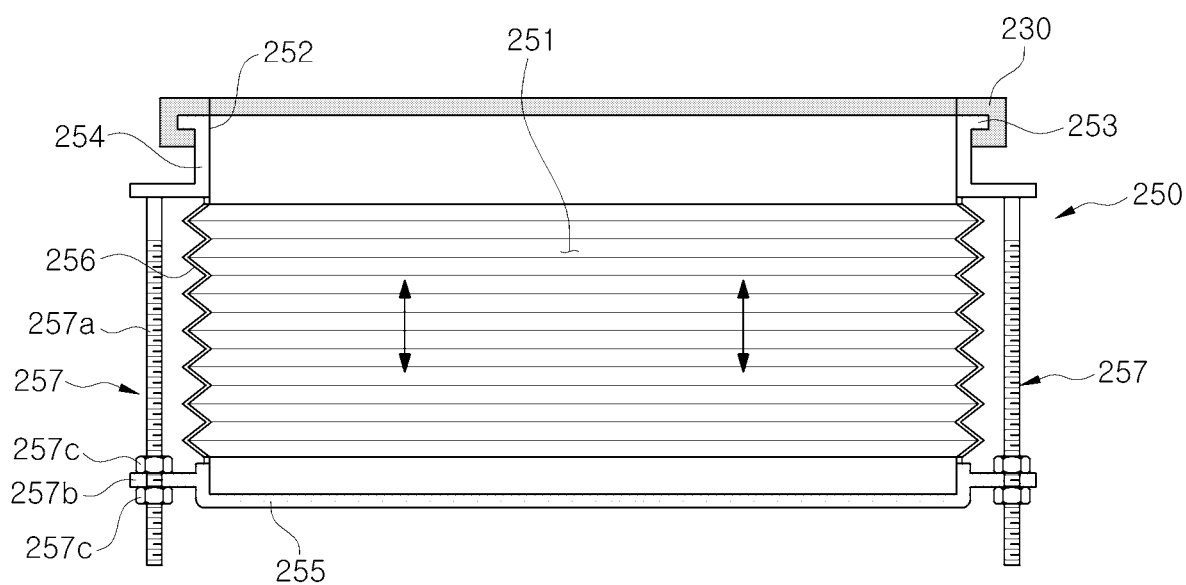
FIG. 6 is a cross-sectional view of the resonance container of FIG. 5.

FIG. 5 is a perspective view illustrating a modified example of a resonance container of the vehicle resonator according to the exemplary embodiment of the present invention, and FIG. 6 is a cross-sectional view of the resonant container of FIG. 5.

A resonance container 250 shown in FIG. 5 and FIG. 6 can vary the volume of a resonance space 251 without separating the resonance container 250 by adjusting the height of a sidewall. The resonance container 250 includes an upper container frame 254 provided with an opening 252 and a coupling step 253, a sealing member 230 coupled to the coupling step 253, a bottom panel 255 spaced from the container frame 254 and disposed opposite to the opening 252, an expansion/contraction deforming portion 256 that forms a sidewall connecting the periphery of the container frame 254 and the periphery of the bottom panel 255, and an adjusting device 257 for regulating the deformation of the expansion/contraction deforming portion 256.

The expansion/contraction deforming portion 256 may be formed in a bellows shape by use of elastic material. The adjusting device 257 may include a plurality of screw shafts 257a extending toward the periphery of the bottom panel 255 in a state of being fixed to the container frame 254, a plurality of fastening portions 257b provided at the periphery of the bottom panel 255 and to which the plurality of screw shafts 257a are coupled, respectively, and a plurality of tightening nuts 257c fastened to the plurality of screw shafts 257a to fix each fastening portion 257b or adjust the position of each fastening portion 257b. In the exemplary embodiment of the present invention, two adjusting devices 257 are provided on opposite sides of the resonance container 250, but the number and the installation position of the adjusting devices may be changed.

The resonance container 250 can be mounted or dismounted in the same manner as the above-mentioned example with respect to the mounting portion 133 of the cover member 130 shown in FIG. 1. In addition, the resonance container 250 can easily adjust the size of the resonance space 251 by adjusting the position of the bottom panel 255 in a manner of loosening or tightening the plurality of tightening nuts 257c, and can maintain the adjusted state after adjustment. Therefore, it is possible to easily change the attenuation frequency of the noise without separating the resonance container 250 from the mounting portion 133.

As is apparent from the above, the vehicle resonator in accordance with the exemplary embodiment of the present invention can easily change the attenuation frequency of the intake noise by easily replacing the resonance container with another one having a different internal volume when the noise improvement of the intake system is required.

The vehicle resonator in accordance with the exemplary embodiment of the present invention can easily replace the resonance container since the resonance container is mounted to the mounting portion of the air cleaner housing in a sliding manner.

The vehicle resonator in accordance with the exemplary embodiment of the present invention can easily change the noise attenuation frequency without detaching the resonance container from the mounting portion since the internal volume of the resonance container is adjusted by deforming the expansion/contraction deforming portion of the resonance container and the changed internal volume is maintained.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle resonator comprising:
   a mounting portion provided in an air cleaner housing of a vehicle; and
   a resonance container mounted on the mounting portion to be replaceable in a sliding manner and having a resonance space therein communicating with an intake passage inside the air cleaner housing,
   wherein the resonance container includes an opening communicating with the intake passage, a coupling step provided at a periphery of the opening and coupled to the mounting portion, and a sealing member interposed between the coupling step and mounting grooves and
   wherein the mounting portion includes the mounting grooves provided on opposite sides thereof to be in parallel to each other and the coupling step is coupled to the mounting grooves in a sliding manner.

2. The vehicle resonator according to claim 1, wherein the coupling step is provided in a form of a flange at the periphery of the opening, and
   the sealing member is formed of elastic material and is disposed to cover an external surface of the coupling step.

3. The vehicle resonator according to claim 2, wherein the sealing member includes a protrusion formed continuously at an external surface thereof, and the mounting grooves comprise a recessed portion that is formed on an internal surface thereof to be correspondingly coupled to the protrusion.

4. The vehicle resonator according to claim 1, wherein the resonance container further includes an expansion/contraction deforming portion provided along a sidewall periphery thereof to vary a volume of the resonance space.

5. The vehicle resonator according to claim 4, wherein the expansion/contraction deforming portion is formed in a bellows shape by use of elastic material.

6. The vehicle resonator according to claim 1, wherein the resonance container includes:
   a container frame provided with the opening and the coupling step;
   a bottom panel spaced from the container frame and disposed opposite to the opening; and
   an expansion/contraction deforming portion that is formed in a bellows shape and forms a sidewall connecting a periphery of the container frame and a periphery of the bottom panel.

7. The vehicle resonator according to claim 6, wherein the resonance container further includes an adjusting device to adjust deformation of the expansion/contraction deforming portion.

8. The vehicle resonator according to claim 7, wherein the adjusting device includes:
   a plurality of screw shafts extending toward the periphery of the bottom panel in a state of being fixed to the container frame;
   a plurality of fastening portions provided at the periphery of the bottom panel and to which the plurality of screw shafts are coupled, respectively; and
   a plurality of tightening nuts fastened to the plurality of screw shafts to fix the fastening portions and adjust positions of the fastening portions.

9. A vehicle resonator comprising:
   a mounting portion provided in an air cleaner housing of a vehicle; and
   a resonance container mounted on the mounting portion and having a resonance space therein communicating with an intake passage inside the air cleaner housing,
   wherein the resonance container includes an expansion/contraction deforming portion provided along a sidewall periphery thereof to vary a volume of the resonance space, and
   wherein the resonance container further includes an adjusting device to adjust deformation of the expansion/contraction deforming portion.

10. The vehicle resonator according to claim 9, wherein the resonance container includes:
    a container frame coupled to the mounting portion; and
    a bottom panel connected to the container frame by the expansion/contraction deforming portion.

11. The vehicle resonator according to claim 10, wherein the adjusting device includes:
    a plurality of screw shafts extending toward a periphery of the bottom panel in a state of being fixed to the container frame;
    a plurality of fastening portions provided at the periphery of the bottom panel and to which the plurality of screw shafts are coupled, respectively; and
    a plurality of tightening nuts fastened to the plurality of screw shafts to fix the fastening portions and adjust positions of the fastening portions.

12. The vehicle resonator according to claim 9, wherein the expansion/contraction deforming portion is formed in a bellows shape by use of elastic material.

13. A vehicle air cleaner comprising:
an air cleaner housing connected to an intake passage of a vehicle; and
a resonator disposed in the air cleaner housing,
wherein the resonator includes:
   a mounting portion provided in the air cleaner housing; and
   a resonance container mounted on the mounting portion to be replaceable in a sliding manner and having a resonance space therein communicating with an intake passage inside the air cleaner housing,
wherein the resonance container includes an opening communicating with the intake passage, a coupling step provided at a periphery of the opening and coupled to the mounting portion, and a sealing member interposed between the coupling step and mounting grooves, and
wherein the mounting portion includes the mounting grooves extending from a first cover portion and a second cover portion and provided on opposite sides thereof to be in parallel to each other and the coupling step is coupled to the mounting grooves in a sliding manner.

14. The vehicle air cleaner according to claim 13, wherein the air cleaning housing includes:
   a main body including a filter accommodating portion which has an open upper portion and in which an air filter is accommodated, and a space forming portion provided integrally with the filter accommodating portion at a side of the filter accommodating portion and having an open upper portion; and
   a cover member coupled to an upper portion of the main body and having the first cover portion covering the open upper portion of the filter accommodating portion, the second cover portion covering the open upper portion of the space forming portion, and the mounting portion on which the resonance container is mounted.

15. The vehicle air cleaner according to claim 14, wherein the cover member includes:
   a first partitioning portion partitioning the filter accommodating portion and an internal space of the mounting portion and having a first air hole communicating an intake passage of the filter accommodating portion with an inside of the resonance container;
   a second partitioning portion partitioning the filter accommodating portion and the space forming portion and having a plurality of second air holes communicating the intake passage of the filter accommodating portion and an inside of the space forming portion; and
   a third partitioning portion partitioning the space forming portion and the internal space of the mounting portion.

16. The vehicle air cleaner according to claim 14, wherein the coupling step is provided in a form of a flange at a periphery of the opening, and
   the sealing member is formed of elastic material and is disposed to cover an external surface of the coupling step.

17. The vehicle air cleaner according to claim 14, wherein the resonance container includes:
   a container frame provided with the opening and the coupling step;
   a bottom panel spaced from the container frame and disposed opposite to the opening; and
   an expansion/contraction deforming portion that is formed in a bellows shape and forms a sidewall connecting a periphery of the container frame and a periphery of the bottom panel.

18. The vehicle air cleaner according to claim 17, wherein the resonance container further includes an adjusting device to adjust deformation of the expansion/contraction deforming portion.

19. The vehicle air cleaner according to claim 18, wherein the adjusting device includes:
   a plurality of screw shafts extending toward the periphery of the bottom panel in a state of being fixed to the container frame;
   a plurality of fastening portions provided at the periphery of the bottom panel to couple the plurality of screw shafts, respectively; and
   a plurality of tightening nuts fastened to the plurality of screw shafts to fix the fastening portions and adjust positions of the fastening portions.

* * * * *